US009521594B2

(12) United States Patent
Han (10) Patent No.: US 9,521,594 B2
(45) Date of Patent: Dec. 13, 2016

(54) METHOD AND DEVICE FOR NOTIFYING HANDOVER FAILURE INDICATION INFORMATION (75) Inventor: Lifeng Han, Shenzhen (CN)

(73) Assignee: ZTE CORPORATION, Shenzhen, Guangdong (CN)

( * ) Notice: Subject to any disclaimer, the term of this patent is extended or adjusted under 35 U.S.C. 154(b) by 642 days.

(21) Appl. No.: 13/139,706

(22) PCT Filed: Mar. 25, 2010

(86) PCT No.: PCT/CN2010/071313
§ 371 (c)(1),
(2), (4) Date: Jun. 14, 2011

(87) PCT Pub. No.: WO2011/006376
PCT Pub. Date: Jan. 20, 2011

(65) Prior Publication Data
US 2011/0250925 A1    Oct. 13, 2011

(30) Foreign Application Priority Data
Jul. 15, 2009    (CN) .......................... 2009 1 0151990

(51) Int. Cl.
H04W 36/00        (2009.01)
(52) U.S. Cl.
CPC ................. *H04W 36/0055* (2013.01)
(58) Field of Classification Search
CPC ............. H04W 36/00; H04W 36/0083; H04W 36/0097; H04W 36/08; H04W 36/36; H04W 36/30; H04W 36/38; H04W 36/16; H04W 36/24
(Continued)

(56) References Cited

U.S. PATENT DOCUMENTS

2008/0020770 A1    1/2008  Hofmann
2008/0160989 A1*   7/2008  Favre et al. .................. 455/424
(Continued)

FOREIGN PATENT DOCUMENTS

CN    101212775 A    7/2008
CN    101374321 A    2/2009
(Continued)

OTHER PUBLICATIONS

International Search Report in international application No. PCT/CN2010/071313, mailed on Jun. 3, 2010.
(Continued)

*Primary Examiner* — Rafael Pérez-Gutiérrez
*Assistant Examiner* — Joshua Schwartz
(74) *Attorney, Agent, or Firm* — Knobbe, Martens, Olson & Bear LLP (57) ABSTRACT The invention discloses a method for notifying handover failure indication information, comprising: a first base station determines, according to radio link failure (RLF) information in a received radio resource control (RRC) re-establishment request message, the information about a cell in which an RLF happens before a UE initiates an RRC re-establishment, and sends the RLF information to a second base station to which the cell where the RLF happens belongs; and the second base station notifies, according to a notification condition set for the indication information of a too early handover or a handover selecting a wrong target handover cell, the base station initiating a handover of the indication information of a too early handover or a handover selecting a wrong target handover cell, both of which meet the notification condition; or upon determining the handover of the UE to a cell in which an RLF happens is a too early handover or a handover selecting a wrong target handover cell, the second base station notifies the base station initi-
(Continued)

ating the handover of the indication information of the too early handover or the handover selecting a wrong target handover cell. The present invention also discloses a device for realizing the method. The invention increases the success rate of a cell handover.

6 Claims, 5 Drawing Sheets

(58) Field of Classification Search
USPC .................................................. 455/436–444
See application file for complete search history.

(56) References Cited

U.S. PATENT DOCUMENTS

| | | |
|---|---|---|
| 2008/0261600 A1* | 10/2008 | Somasundaram et al. ... 455/436 |
| 2009/0149180 A1 | 6/2009 | Kitazoe |
| 2010/0113033 A1 | 5/2010 | Qiu et al. |
| 2010/0165836 A1 | 7/2010 | Wahlqvist |
| 2010/0173633 A1* | 7/2010 | Catovic et al. ............... 455/436 |
| 2010/0267378 A1 | 10/2010 | Hamabe |

FOREIGN PATENT DOCUMENTS

| | | |
|---|---|---|
| CN | 201204698 Y | 3/2009 |
| EP | 2068572 A1 | 6/2009 |
| JP | 2008104167 A | 5/2008 |
| JP | 2010532111 A | 9/2010 |
| JP | 2010535433 A | 11/2010 |
| RU | 2291591 C2 | 1/2007 |
| WO | 03088695 A1 | 10/2003 |
| WO | 2008086460 A2 | 7/2008 |
| WO | 2008151658 A1 | 12/2008 |
| WO | 2009060935 A1 | 5/2009 |

OTHER PUBLICATIONS

English Translation of the Written Opinion of the International Search Authority in international application No. PCT/CN2010/071313, mailed on Jun. 3, 2010.
3GPP TSG-RAN, R2-081806 Mar. 24, 2008 in 6 pages.
3GPP TSG-RAN, R1-091446 Mar. 23, 2009 in 6 pages.
3GPP TSG RAN WG3 Meeting #64, "RLF Reports for Mobility Robustness Optimization," May 4-8, 2009 in 5 pages.
3GPP TSG RAN WG3 #64, "MR Signalling Requirements," May 4-8, 2009 in 8 pages.
3GPP TS 36.300 V8.6.0 (Release 8) in 137 pages (Sep. 2008).
Radio Link Failure Recovery, R2-072382 Jun. 2007.
The partial supplementary European Search Report in European application No. 10799374.3, mailed on Apr. 30, 2015.
Huawei, "Addressing the requirements for HO optimisation," dated Oct. 6, 2008 in 9 pages.
Supplementary European Search Report in European Application No. 10799374.3, mailed Jul. 29, 2015 in 19 pages.

* cited by examiner

METHOD AND DEVICE FOR NOTIFYING HANDOVER FAILURE INDICATION INFORMATION

TECHNICAL FIELD

The present invention relates to a handover technology used for a user equipment, in particular to a method and a device for notifying handover failure indication information in a long term evolution (LTE) system.

BACKGROUND

An LTE network consists of an evolved universal terrestrial radio access network (E-UTRAN), evolved NodesB (eNBs) and an evolved packet core (EPC), wherein the to E-UTRAN comprises a set of eNBs connected with the EPC via interfaces S1, the eNBs are interconnected via interfaces X2, wherein the S1 and the X2 are logic interfaces. One EPC may manage one or more eNBs, and one eNB may be controlled by multiple EPCs and may manage one or more cells.

A self organizing network (SON) is a technology of automatic network configuration and optimization. This technology, characterized in self-configuration and self-optimization, is applied in an LTE network to make the LTE network configure network parameters automatically according to a given measurement and perform self-optimization according to network changes, thereby keeping the best network performance and saving plenty of human and material resources.

As for self-optimization of handover parameters of an LTE system, cell reselection and handover-related parameters are optimized according to a given algorithm based on the running status of the network and handover-related measurements so as to improve network performance. The handover herein means a handover within an LTE system and a handover between systems, the latter one is a handover to a UTRAN or a global system for mobile communication (GSM) or a code division multiple access (CDMA) system. A handover carried out by a user equipment (UE) in a network is that the network side makes a handover decision according to a given handover algorithm based on the signal quality of a cell covering the UE and a neighbouring cell reported by the UE, then notifies the UE to perform a concrete handover according to the handover decision. An inappropriate configuration of handover parameters may lead to an undesired Ping-Pong handover, which may cause a handover failure and a radio link failure (RLF), and may also have a negative effect on the user experience and waste network resources. Therefore, for self-optimization of handover parameters, an accurate judgment on a handover failure or an undesired handover is the foundation for the adjustments to handover parameters.

A radio resource control (RRC) may be re-established after an RLF happens to a UE, and user information may be stored in a source base station or a target base station for the RRC re-establishment. The UE may make a UE identifier contained in an RRC re-establishment request message, the UE identifier including a cell radio network temporary identifier (C-RNTI), a short medium access control integrity protection (short MAC-I) and a physical cell identity (PCI), wherein the C-RNTI is distributed in a source cell (a scene of a handover failure) or in a cell triggering an RRC re-establishment (other scenes). The PCI is the physical identity of a source cell (a scene of a handover failure) or the physical identity of a cell triggering an RRC re-establishment (other scenes).

The UE selects a cell for an RRC re-establishment mainly according to the quality of radio signals, so a judgment on a handover scene can be made based on a cell where an RLF happens and a cell where an RRC is re-established. An undesired handover scene herein means a too early handover or a handover selecting a wrong target handover cell; and handover parameters can be optimized according to statistical information about a specific undesired handover scene.

Figure 1:
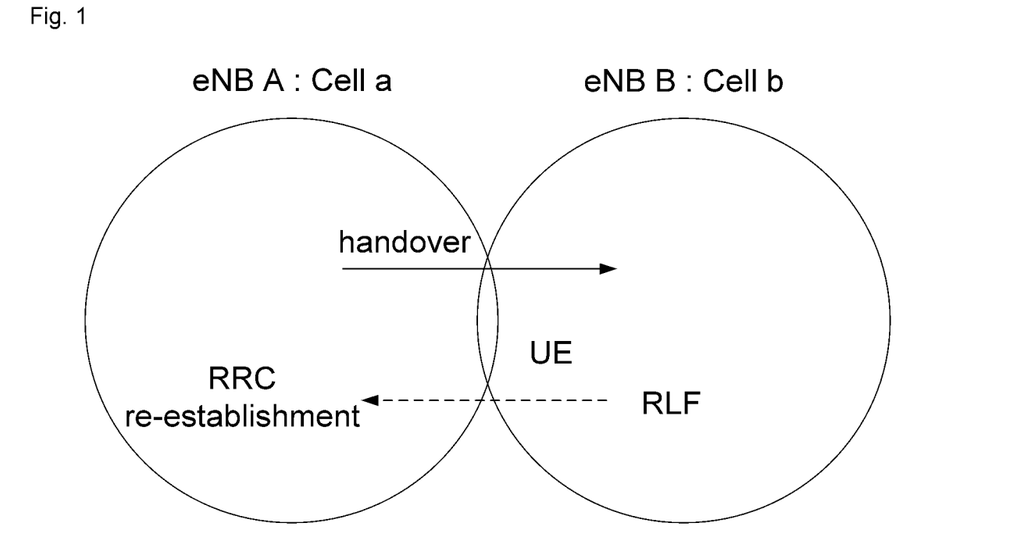
FIG. 1 is a schematic diagram of a scene of a too early handover.

FIG. 1 is a schematic diagram of a scene of a too early handover; as illustrated in FIG. 1, shortly after a handover of a UE from Cell a of eNB A to Cell b of eNB B, an RLF happens in the Cell b, then the UE selects to perform an RRC re-establishment in the Cell a, that is, the UE returns to the original cell to perform an RRC re-establishment, this process shows that the handover of the UE from the Cell a to the Cell b is too early.

Figure 2:
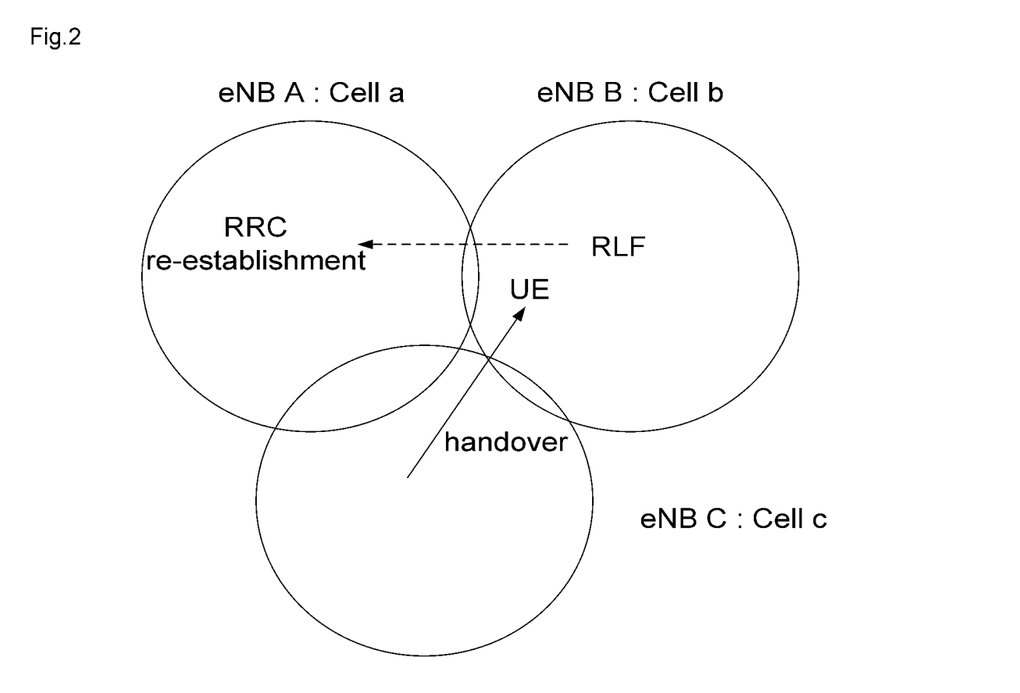
FIG. 2 is a schematic diagram of a scene of a handover selecting a wrong target handover cell.

FIG. 2 is a schematic diagram of a scene of a handover selecting a wrong target handover cell; as illustrated in FIG. 2, shortly after a handover of a UE from Cell c of eNB C to Cell b of eNB B, an RLF happens, then the UE performs an RRC re-establishment in Cell a of eNB A, which means that the selected Cell b of the eNB B is a wrong target cell and the correct one is the Cell a, that is, the UE should directly perform a handover from the Cell c to the Cell a.

The judgment on a cell handover scene is the foundation for the configuration of handover parameters, if notified of a cell handover failure and the cause for the failure, the network side can configure handover parameters accordingly, thereby improving the success rate of a cell handover and avoiding a waste of network resources and a decline in the quality of communication service due to a wrong selection of a target handover cell.

SUMMARY

In view of this, the present invention mainly aims to provide a method and a device for notifying handover failure indication information, which are capable of judging a handover scene of a UE and notifying the base station initiating the handover to adjust handover parameters according to the cause for the handover, thereby making a network side configure more suitable handover parameters.

In order to achieve the purposes above, the technical scheme of the invention is realized as follows:

A method for notifying handover failure indication information comprises:

a first base station determines, according to RLF information in a received RRC re-establishment request message, the information about a cell in which an RLF happens before a UE initiates an RRC re-establishment, and sends the RLF information to a second base station to which the cell where an RLF happens belongs; and upon determining that a handover of the UE to the cell in which an RLF happens is a too early handover or a handover selecting a wrong target handover cell, the second base station notifies the base station initiating the handover of the indication information of the too early handover or the handover selecting a wrong target handover cell.

Preferably, when the indication information of the too early handover or the handover selecting a wrong target handover cell is notified to the base station initiating the handover, the method may further comprise: the second base station notifies the base station initiating the handover of the cause for the handover of the UE.

Preferably, the second base station may determine that the handover of the UE to the cell in which an RLF happens is a too early handover if the second base station determines that before the RLF happens the UE has been switched from a current RRC re-establishment cell in the first base station to the cell where the RLF happens and the duration for the completion of the handover is smaller than a set threshold; and the second base station may determine that the handover of the UE to the cell in which an RLF happens is a handover selecting a wrong target handover cell if the second base station determines that before the RLF happens the UE has been switched to the cell in which the RLF happens from a cell in a third base station and the duration for completing the handover is smaller than a set threshold.

A method for notifying handover failure indication information comprises:

a first base station determines, according to RLF information in a received RRC re-establishment request message, the information about a cell in which an RLF happens before a UE initiates an RRC re-establishment, and sends the RLF information to a second base station to which the cell where an RLF happens belongs; and the second base station notifies, according to a notification condition set for the indication information of a too early handover or a handover selecting a wrong target handover cell, a base station initiating a handover of the indication information of a too early handover or a handover selecting a wrong target handover cell, both two handovers here meeting the notification condition.

Preferably, the notification condition for the indication information of a too early handover or a handover selecting a wrong target handover cell may be as follows: only a handover initiated due to radio quality is notified; and upon determining that handover causes include the cause related to radio quality, the second base station notifies the base station initiating the handover of the indication information of a too early handover or a handover selecting a wrong target handover cell, both the two handovers here happening due to radio quality.

Preferably, the second base station may determine that the handover of the UE to the cell in which an RLF happens is a too early handover if the second base station determines that before the RLF happens the UE has been switched from a current RRC re-establishment cell in the first base station to the cell in which the RLF happens and the duration for the completion of the handover is smaller than a set threshold;

the second base station determines that the handover of the UE to the cell in which an RLF happens is a handover selecting a wrong target handover cell if the second base station determines that before the RLF happens UE has been switched to the cell where the RLF happens from a cell in a third base station and the duration for completing the handover is smaller than a set threshold.

A device for notifying handover failure indication information comprises a receiving unit, a first determining unit, a second determining unit, a sending unit, a third determining unit, and a notifying unit;

wherein the receiving unit is used for receiving an RRC re-establishment request message;

the first determining unit is used for determining the inclusion of RLF information in the RRC re-establishment request message;

the second determining unit is used for determining the information about a cell in which an RLF happens before a UE initiates an RRC re-establishment according to the RLF information;

the sending unit is used for sending the RLF information to the base station to which the cell where an RLF happens belongs;

to the third determining unit is used for determining that the handover of the UE to the cell in which an RLF happens is a too early handover or a handover selecting a wrong target handover cell;

and the notifying unit is used for notifying the base station initiating the handover of the indication information of the too early handover or the handover selecting a wrong target handover cell;

wherein the receiving unit, the first determining unit, the second determining unit and the sending unit belong to a first base station; and the third determining unit and the notifying unit belong to a second base station.

Preferably, the device may further comprise a searching unit for searching the cause for the handover of the UE; and the notifying unit notifies the base station initiating the handover of the cause found out by the searching unit, wherein the searching unit belongs to the second base station.

A device for notifying handover failure indication information comprises a setting unit, a receiving unit, a first determining unit, a second determining unit, a sending unit, a third determining unit, a judging unit and a notifying unit;

wherein the setting unit is used for setting a notification condition for the indication information of a too early handover or a handover selecting a wrong target handover cell;

the receiving unit is used for receiving an RRC re-establishment request message;

the first determining unit is used for determining the inclusion of RLF information in the RRC re-establishment request message;

the second determining unit is used for determining the information about a cell in which an RLF happens before a UE initiates an RRC re-establishment according to the RLF information;

the sending unit is used for sending the RLF information to the base station to which the cell where an RLF happens belongs;

the third determining unit is used for determining that the handover of the UE to the cell in which an RLF happens is a too early handover or a handover selecting a wrong target handover cell;

the judging unit is used for judging whether the too early handover or the handover selecting a wrong target handover cell determined by the third determining unit meets a notification condition for indication information, and triggering the notifying unit if the condition is met;

the notifying unit is used for notifying the base station initiating the handover of the indication information of the too early handover or the handover selecting a wrong target handover cell;

wherein the setting unit, the receiving unit, the first determining unit, the second determining unit and the sending unit belong to a first base station; and the third determining unit, the judging unit and the notifying unit belong to a second base station;

Preferably, the notification condition for the indication information of a too early handover or a handover selecting a wrong target handover cell may be as follows: only a handover initiated due to radio quality is notified; and upon determining that handover causes include the cause related to radio quality, the judging unit triggers the notifying unit to notify the base station initiating the handover of the indication information of the too early handover or the handover selecting a wrong target handover cell, both the two handovers here happening due to radio quality.

In this invention, when a scene of a too early handover or a handover selecting a wrong target handover cell happens to a UE during a cell handover process, the indication information of the too early handover or the handover selecting a wrong target handover cell and the cause for the failure are notified timely to the base station initiating the handover, then the base station initiating the handover reconfigures handover parameters, thus the occurrence of a too early handover or a handover selecting a wrong target handover cell is avoided in the UE. By configuring handover parameters dynamically, the invention increases the success rate of a cell handover, saves network resources in the handover process and improves the service quality of communication systems greatly.

DETAILED DESCRIPTION OF THE INVENTION

The foundational idea of the present invention is that: when a too early handover or a handover selecting a wrong target handover cell happens to a UE during a cell handover, the indication information of the too early handover or the handover selecting a wrong target handover cell and the cause for the failure are notified timely to a base station initiating the handover, then the base station initiating the handover reconfigures handover parameters to eliminate the occurrence of a too early handover or a handover selecting a wrong target handover cell in the UE. By dynamically configuring handover parameters, the present invention increases the success rate of a cell handover, saves network resources in the handover process and improves the service quality of communication systems greatly.

In order to make the purpose, the technical schemes and the advantages of the invention more clear, the present invention is described in detail by reference to the following embodiments in combination with the accompanying figures.

Embodiment 1

This embodiment is for the application scene illustrated in FIG. 1.

Figure 3:
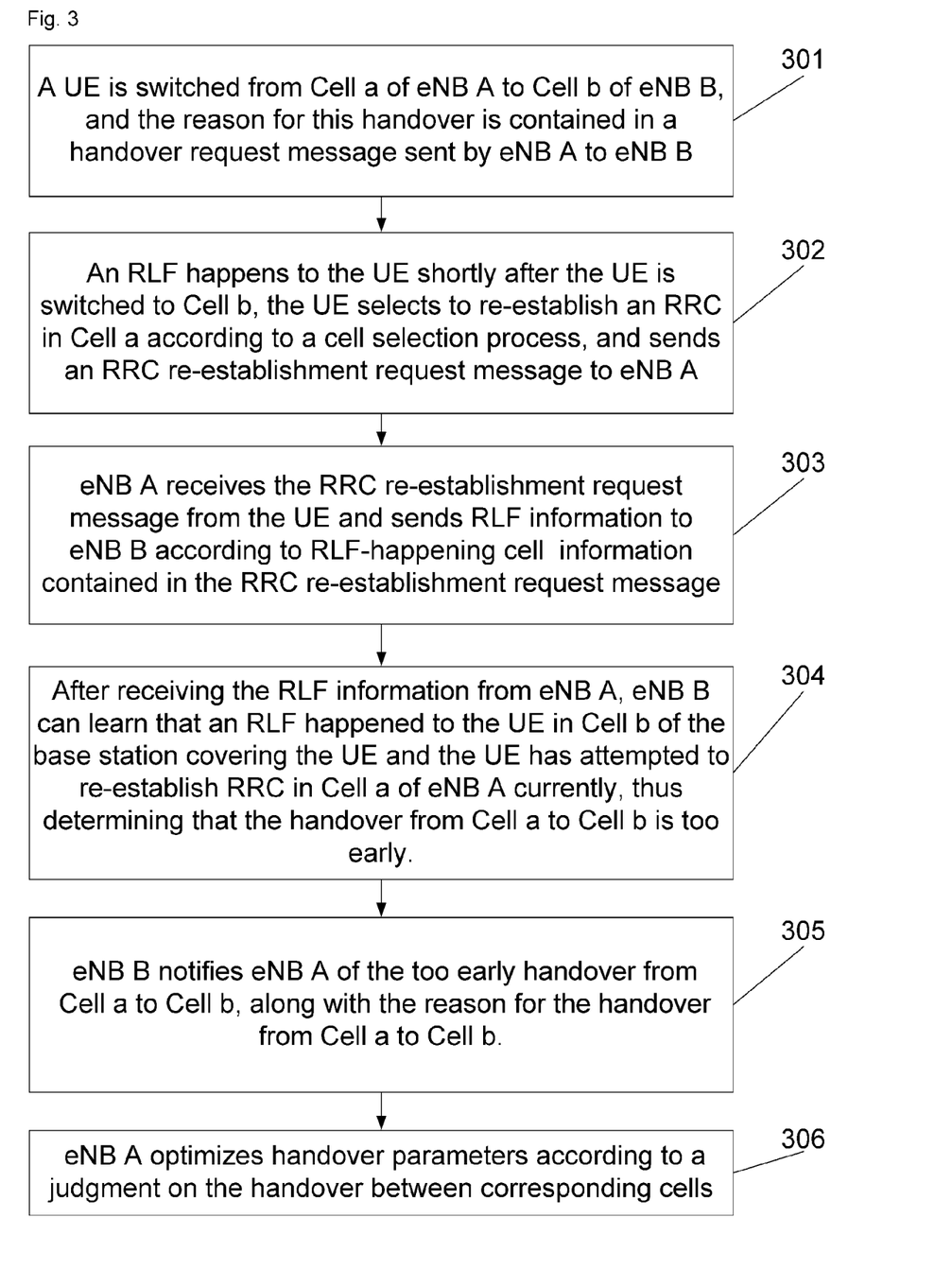
FIG. 3 is a flowchart of a method for notifying a handover cause when a too early handover of a UE from Cell a to Cell b happens.

FIG. 3 is a flowchart of a method for notifying a handover cause when a too early handover of a UE from Cell a to Cell b happens; as shown in FIG. 3, according to this embodiment, the method for notifying a handover cause when a too early handover of a UE from Cell a to Cell b happens comprises:

301: a handover of a UE from Cell a of eNB A to Cell b of eNB B happens, and the cause for initiating this handover is contained in a handover request message sent by the eNB A to the eNB B.

The UE in the Cell a determines to initiate a request for a handover to a neighbouring cell (the Cell b), or the eNB A sends a target base station (the eNB B) a request of switching the UE to the Cell b; the cause for the handover may be that: the UE finds the radio signal intensity of the Cell b meeting handover requirements when performing a radio signal intensity measurement in the Cell a on a neighbouring cell (the Cell b); or the eNB A confirms that there are too many users accessing the Cell a and it is necessary to share the load of the Cell a.

302: an RLF happens shortly after the UE is switched to the Cell b, then the UE selects to re-establish an RRC in the Cell a according to a cell selection process, that is, the UE returns to the original cell before handover to re-establish an RRC, and the UE sends an RRC re-establishment request message to the eNB A.

303: the eNB A receives the RRC re-establishment request message from the UE and sends RLF information to the eNB B according to RLF-happening cell information contained in the RRC re-establishment request message.

The RLF information may include PCI or CGI information of the Cell b where an RLF happens, PCI or evolved cell global identifier (ECGI) information of the Cell a where an RRC re-establishment is tried, and C-RNTI information of the UE in the Cell b where an RLF happens. The RLF information is specifically sent to the eNB B via an interface X2/S1, namely, it is directly transmitted via the logic interface X2 between the eNB A and the eNB B, or the eNB A sends the RLF information to a network side first, then the network side sends the RLF information to the eNB B.

304: after receiving the RLF information from the eNB A, the eNB B learns that an RLF happened to the UE in the Cell b of the base station covering the UE, and currently, the UE has attempted to re-establish an RRC in the Cell a of the eNB A.

The eNB B searches for the cause for the last handover of the UE locally, and if the information stored in the eNB B on the last handover of the UE shows that the UE has just been switched to the Cell b from the Cell a and the duration for the completion of this handover is smaller than a set threshold, then the eNB B determines this handover is a too early handover, wherein the threshold, which can be empirically set to be 1 second, 0.5 second and so on, is set by operation administration and maintenance (OAM) in related protocols.

305: the eNB B notifies the eNB A of the too early handover from the Cell a to the Cell b, along with the indication information of the too early handover and the cause for this handover from the Cell a to the Cell b. Specifically, the indication information of the too early handover and the handover cause are transmitted via an interface X2/S1.

Herein, the cause for the handover may be that the UE detects and finds that the radio signal quality of the Cell b is good enough to meet the handover condition or that the users accessing the eNB A are too many and the load of the eNB A is relatively high; in short, the eNB A is notified of the real cause found out for the handover from the Cell a to the Cell b.

It should be noted that if the system has set a notification condition for the indication information of a too early handover, such as a handover cause filtering condition, the eNB B may determine whether to notify the eNB A of the indication information of a too early handover according to a specific handover cause. Specifically, for example, if it is set by the system that the indication information of a too early handover is notified to the eNB A only if the handover cause is related to radio signal quality, then neither the indication information of the too early handover nor a handover cause is notified to the eNB A if the handover cause does not include the cause related to radio signal quality; if handover causes also include other handover causes besides the cause related to radio signal quality, the indication information of a too early handover is notified to the eNB A, but the handover causes are not sent to the eNB A; when receiving the indication information of the too early handover, the eNB A can confirm that the causes include the one related to radio signal quality which leads to this handover, and a handover cause filtering is thereby realized. This scene can be applied to tests on various handover causes. The notification condition for the indication information of a too early handover can be set based on a concrete application scene and is not limited to the foregoing case of just notifying a handover cause related to radio signal quality.

And 306: the eNB A optimizes handover parameters according to a judgment on the handover between corresponding cells to improve handover performance.

Embodiment 2

This embodiment is for the application scene illustrated in FIG. 2.

Figure 4:
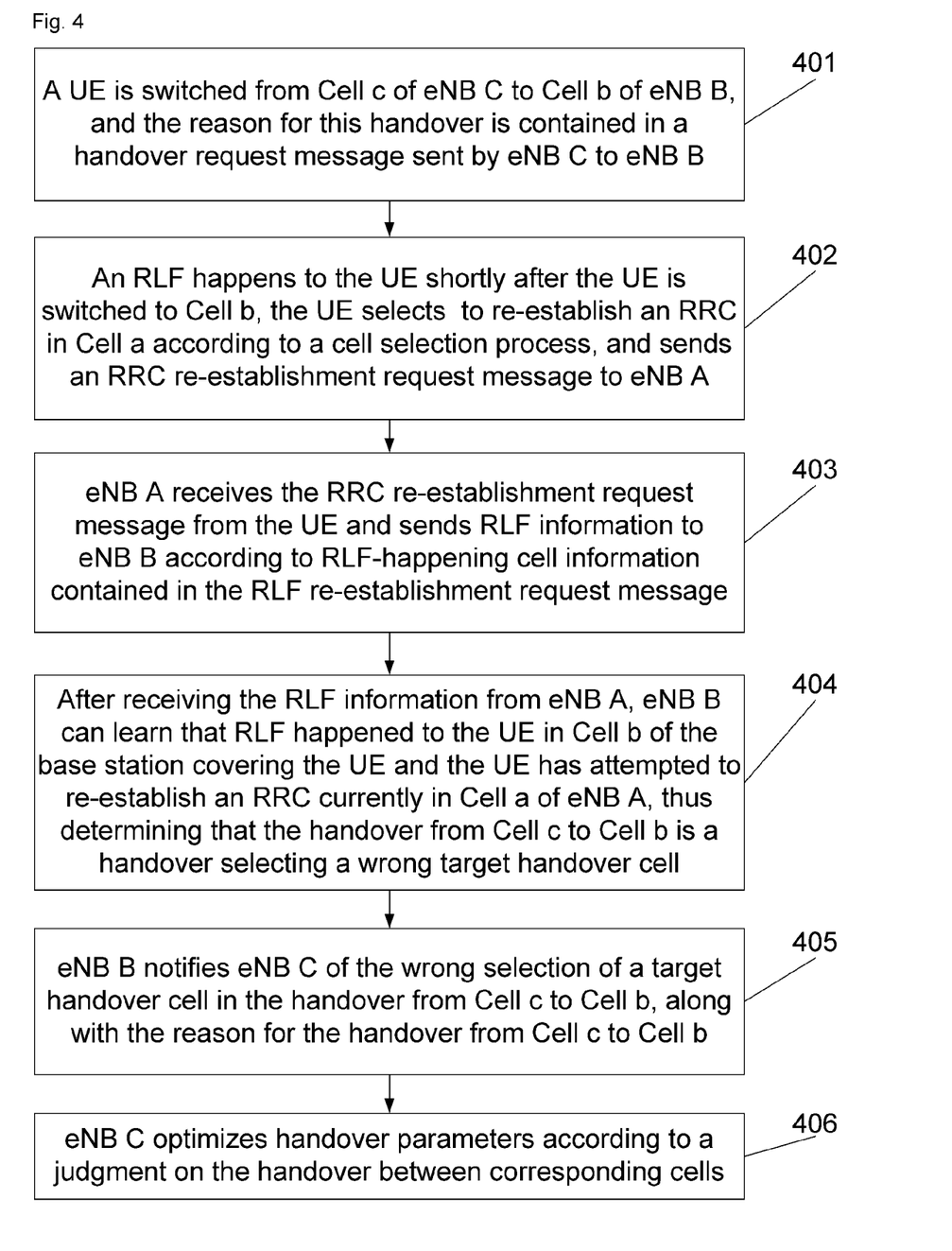
FIG. 4 is a flowchart of a method for notifying a handover cause when a wrong target cell is selected in a handover of a UE from Cell c to Cell b.

FIG. 4 is a flowchart of a method for notifying a handover cause when a wrong target cell is selected during a handover of a UE from Cell c to Cell b, as shown in FIG. 4, in this embodiment the method comprises:

401: a UE is switched from Cell c of eNB C to Cell b of eNB B, the cause for initiating this handover is contained in a handover request message sent by the eNB C to the eNB B; see relevant description in 301 for the cause for this handover.

402: an RLF happens to the UE shortly after the UE is switched to the Cell b, then the UE selects to re-establish an RRC in Cell a according to a cell selection process, and sends an RRC re-establishment request message to the eNB A.

403: the eNB A receives the RRC re-establishment request message from the UE and sends RLF information to the eNB B according to RLF-happening cell information contained in the RRC re-establishment request message.

The RLF information may include PCI or CGI information of the Cell b where an RLF happens, PCI or ECGI information of the Cell a in which an RRC re-establishment is tried, and C-RNTI information of the UE in the Cell b where an RLF happens; specifically, the RLF information is sent to the eNB B via an interface X2/S1.

404: after receiving the RLF information from the eNB A, the eNB B learns that an RLF happened to the UE in the Cell b of the base station covering the UE, and currently, the UE has attempted to re-establish an RRC in the Cell a of the eNB A.

The eNB B searches for the cause for the last handover of the UE locally, and if the information stored in the eNB B on the last handover of the UE shows that the UE has just been switched to the Cell b from the Cell c of the eNB C and the duration for the completion of this handover is smaller than a set threshold, then the eNB B can determine that a wrong target cell is selected for the handover of the UE from the Cell c to the Cell b, wherein the threshold, which can be empirically set to be 1 second, 0.5 second and so on, is herein set by OAM.

405: the eNB B notifies the eNB C of the wrong selection of a target cell in the handover from the Cell c to the Cell b, along with the cause for the handover from the Cell c to the Cell b. Specifically, the indication information of the handover selecting a wrong target handover cell and the handover cause are transmitted via an interface X2/S1.

Herein, the cause for the handover may be that the UE detects and finds that the radio signal quality of the Cell b is good enough to meet the handover condition or that the users accessing the eNB A are too many and the load of the eNB A is relatively high; in short, the eNB A is notified of the real cause found out for the handover from the Cell a to the Cell b.

It should be noted that if the system has set a notification condition for the indication information of a handover selecting a wrong target handover cell, such as a handover cause filtering condition, then the eNB B may determine whether to notify the eNB A of the indication information of such handover according to a specific handover cause. Specifically, for example, if it is set by the system that the indication information of such handover is notified to the eNB A only if the handover cause is related to radio signal quality, then neither the indication information of this handover nor a handover cause is notified to the eNB A if the handover cause does not include the cause related to radio signal quality; if handover causes including the cause related to radio signal quality may also include other handover causes, then the indication information of this handover is notified to the eNB A, but the handover causes are not sent to the eNB A; after receiving the indication information of this handover, the eNB A can determine that the causes, including the one related to radio signal quality, lead to this handover, and a handover cause filtering is thereby realized. This scene can be applied to tests on various handover causes. The notification condition for the indication information of a handover selecting a wrong target handover cell can be set based on a concrete application scene and is not limited to the foregoing case of just notifying a handover cause related to radio signal quality.

And 406: the eNB C optimizes handover parameters according to a judgment on the handover between corresponding cells to improve handover performance.

Figure 5:
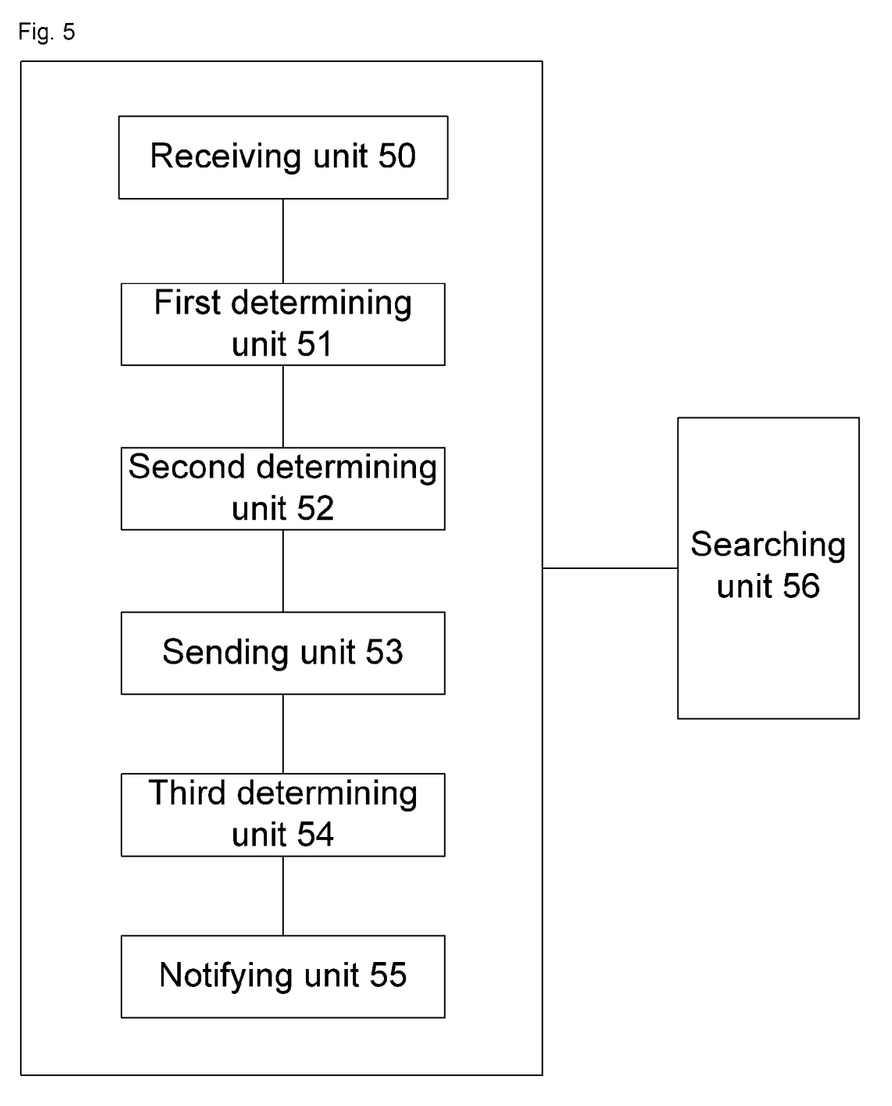
FIG. 5 is a schematic diagram of the structure of a device for notifying handover failure indication information disclosed in the present invention.

FIG. 5 is a schematic diagram of the structure of a device for notifying handover failure indication information disclosed in the invention; as shown in FIG. 5, the device for notifying handover failure indication information comprises a receiving unit 50, a first determining unit 51, a second determining unit 52, a sending unit 53, a third determining unit 54, and a notifying unit 55, wherein the receiving unit 50 is used for receiving an RRC re-establishment request message; the first determining unit 51 is used for determining the inclusion of RLF information in the RRC re-establishment request message; the second determining unit 52 is used for determining the information about a cell in which an RLF happens before a UE initiates an RRC re-establishment according to the RLF information; the sending unit 53 is used for sending the RLF information to the base station to which the cell where the RLF happens belongs; the third determining unit 54 is used for determining that the handover of the UE to a cell in which an RLF happens is a too early handover or a handover selecting a wrong target handover cell; and the notifying unit 55 is used for notifying the base station initiating the handover of the indication information of a too early handover or a handover selecting a wrong target handover cell.

Wherein, the receiving unit 50, the first determining unit 51, the second determining unit 52 and the sending unit 53 belong to a first base station; and the third determining unit 54 and the notifying unit 55 belong to a second base station.

As illustrated in FIG. 5, the device further comprises a searching unit 56 for searching the cause for the handover of the UE; the notifying unit 55 notifies the base station initiating the handover of the cause found out by the searching unit 56, wherein the searching unit 56 belongs to the second base station.

Those skilled in the art should understand that the device for notifying handover failure indication information illustrated in FIG. 5 is designed for implementing the aforesaid method for notifying handover failure indication information, the implementation functions of the units illustrated in FIG. 5 can be comprehended by reference to related description in embodiments 1 and 2. The function of each unit of the device illustrated in FIG. 5 can be achieved by running the program in a processor or via a concrete logic circuit.

Figure 6:
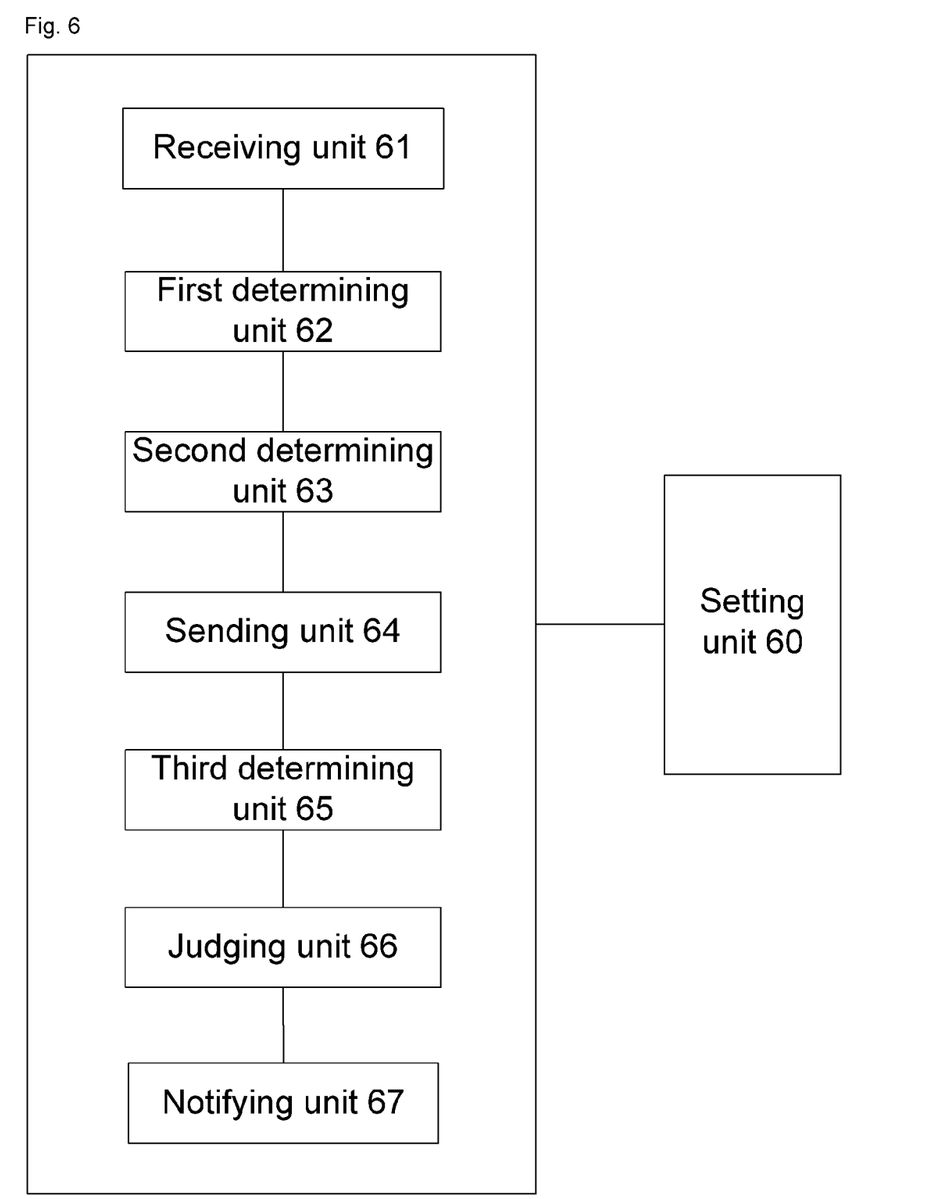
FIG. 6 is a schematic diagram of another structure of the device for notifying handover failure indication information disclosed in the present invention.

FIG. 6 is a schematic diagram of another structure of the device for notifying handover failure indication information disclosed in the invention; the device for notifying handover failure indication information comprises a setting unit 60, a receiving unit 61, a first determining unit 62, a second determining unit 63, a sending unit 64, a third determining unit 65, a judging unit 66 and a notifying unit 67, wherein the setting unit 60 is used for setting a notification condition for the indication information of a too early handover or a handover selecting a wrong target handover cell; the receiving unit 61 is used for receiving an RRC re-establishment request message; the first determining unit 62 is used for determining the inclusion of RLF information in the RRC re-establishment request message; the second determining unit 63 is used for determining the information about a cell in which an RLF happens before a UE initiates an RRC re-establishment according to the RLF information; the sending unit 64 is used for sending the RLF information to the base station to which the cell where the RLF happens belongs; the third determining unit 65 is used for determining that the handover of the UE to the cell in which an RLF happens is a too early handover or a handover selecting a wrong target handover cell; the judging unit 66 is used for judging whether the too early handover or the handover selecting a wrong target handover cell determined by the third determining unit meets a notification condition for indication information, and triggering the notifying unit 67 if the condition is met; and the notifying unit 67 is used for notifying the base station initiating the handover of the indication information of the too early handover or the handover selecting a wrong target handover cell, wherein the two types of handovers meet the notification condition.

The setting unit 60, the receiving unit 61, the first determining unit 62, the second determining unit 63 and the sending unit 64 belong to a first base station; and the third determining unit 65, the judging unit 66 and the notifying unit 67 belong to a second base station.

The notification condition for the indication information of a too early handover or a handover selecting a wrong target handover cell includes that: only the handover initiated due to radio quality is notified. The judging unit 66 judges whether handover causes include the cause related to radio quality, and if so, triggers the notifying unit 67; and the notifying unit 67 notifies the base station initiating the handover of the indication information of the too early handover or the handover selecting a wrong target handover cell, wherein the two types of handovers here are initiated due to radio quality.

The mentioned above is only preferred embodiments of the present invention but not limitation on the protection scope of the invention.

What is claimed is:

1. A method for feeding back RLF-inducing handover information, comprising:

switching, by a source base station, a user equipment (LIE) from a source cell to a target cell; upon occurrence of a radio link failure (RLF) in the target cell, receiving, by the source base station, from the LIE a radio resource control (RRC) re-establishment request message to re\-establish RRC in the source cell managed by the source base station;

determining, by the source base station, according to RLF information in the RRC re\-establishment request message, information about the target cell in which the RLF has occurred; and sending, by the source base station, the RLF information to the target base station managing the target cell; and upon determining that the handover of the LIE to the target cell is premature, feeding, by the target base station, back to the source base station initiating the handover information indicating that the handover is premature, wherein the target base station determines that the handover of the LIE to the target cell is premature by determining that time elapsed since the completion of the handover till the occurrence of the RLF is less than a set threshold, a premature handover being defined as one after which an RLF occurs in the target cell within the set threshold and the LIE selects to return to the source cell for RRC re-establishment, and wherein the RLF information comprises information on an ID of the source cell and wherein the target base station searches for the cause for a last handover of the LIE.

2. The method according to claim 1, further comprising: when the target base station feeds information indicating that the handover is premature back to the source base station initiating the handover, notifying, by the target base station, the source base station initiating the handover of a cause of the handover of the LIE.

3. The method according to claim 1, upon determining that the handover of the LIE to the target cell is premature, feeding, by the target base station, back to the source base station initiating the handover information indicating that the handover is premature, comprising:

feeding, by the target base station, back to the source base station initiating the handover information indicating that the handover is premature when the handover meets a set condition for feeding back information indicating a premature handover.

4. A method for feeding back RLF-inducing handover information, comprising:

switching, by a source base station, a user equipment (UE) from a source cell over to a target cell;

upon occurrence of a radio link failure (RLF) in the target cell, receiving, by a first base station, from the UE a radio resource control (RRC) re-establishment request message to re\-establish RRC in a first cell managed by the first base station;

determining, by the first base station, according to RLF information in the RRC re-establishment request message, information about the target cell in which the RLF has occurred;

sending, by the first base station, the RLF information to a target base station managing the target cell; and upon determining that a handover of the UE to the target cell is the handover selecting a wrong target handover cell, feeding, by the target base station, information indicating that the handover is the handover selecting the wrong target handover cell back to the source base station initiating the handover, wherein the target base station determines that the handover of the UE to the target cell is the handover selecting the wrong target handover cell by determining that time elapsed since the completion of the handover till the occurrence of the RLF is less than a set threshold, a-the handover selecting the wrong target handover cell being defined as one after which an RLF occurs in the target cell within the set threshold and the UE selects a cell other than the source cell or the target cell for RRC re-establishment, wherein the RLF information comprises information on an ID of the first cell and wherein the target base station searches for the cause for a last handover of the UE.

5. The method according to claim 4, further comprising:
when the target base station feeds information indicating that the handover is a-the handover selecting the wrong target handover cell back to the source base station initiating the handover, notifying, by the target base station, the source base station initiating the handover of a cause of the handover of the UE.

6. The method according to claim 4, the upon determining that the handover of the UE to the target cell is a-the handover selecting the wrong target handover cell, feeding, by the target base station, back to the source base station initiating the handover information indicating that the handover is rhea handover selecting the wrong target handover cell, comprising:

feeding, by the target base station, information indicating that the handover is rhea handover selecting the wrong target handover cell back to the source base station initiating the handover when the handover meets a set condition for feeding back information indicating the handover selecting the wrong target handover cell.

* * * * *

UNITED STATES PATENT AND TRADEMARK OFFICE
CERTIFICATE OF CORRECTION

PATENT NO. : 9,521,594 B2
APPLICATION NO. : 13/139706
DATED : December 13, 2016
INVENTOR(S) : Lifeng Han Page 1 of 3

It is certified that error appears in the above-identified patent and that said Letters Patent is hereby corrected as shown below:

In the Specification

In Column 1 at Line 17 (approx.), After "the" delete "to".

In Column 4 at Line 4, before "the" delete "to".

In Column 7 at Lines 61-63, delete "RLF happened to the UE in the Cell b of the base station covering the UE, and currently, the UE has attempted to re-establish an RRC in the Cell a of the eNB A." and insert the same on Column 7, Line 60, as a continuation of the same paragraph.

In Column 8 at Line 16, change "eNB A" to --eNB C--.

In Column 8 at Lines 16-17, change "eNB A" to --eNB C--.

In Column 8 at Line 17, change "eNB A" to --eNB C--.

In Column 8 at Line 18, change "Cell a" to --Cell c--.

In Column 8 at Line 24, change "eNB A" to --eNB C--.

In Column 8 at Line 28, change "eNB A" to --eNB C--.

In Column 8 at Line 30, change "eNB A" to --eNB C--.

In Column 8 at Line 35, change "eNB A," to --eNB C,--.

In Column 8 at Line 36, change "eNB A;" to --eNB C;--.

In Column 8 at Line 37, change "eNB A" to --eNB C--.

Signed and Sealed this
Eighteenth Day of April, 2017

Michelle K. Lee
*Director of the United States Patent and Trademark Office*

CERTIFICATE OF CORRECTION (continued)
U.S. Pat. No. 9,521,594 B2

In the Claims

In Column 10 at Line 13, in Claim 1, change "(LIE)" to --(UE)--.

In Column 10 at Line 15, in Claim 1, change "LIE" to --UE--.

In Column 10 at Line 17, in Claim 1, change "re\-establish" to --"re-establish"--.

In Column 10 at Line 21, in Claim 1, change "re\-establishment" to --"re-establishment"--.

In Column 10 at Line 25, in Claim 1, change "the" to --"a"--.

In Column 10 at Line 26, in Claim 1, change "the" to --"a"--.

In Column 10 at Line 26, in Claim 1, change "(LIE)" to --(UE)--.

In Column 10 at Line 32, in Claim 1, change "(LIE)" to --(UE)--.

In Column 10 at Line 37, in Claim 1, change "(LIE)" to --(UE)--.

In Column 10 at Line 38, in Claim 1, delete "and".

In Column 10 at Line 40, in Claim 1, change "cell and" to --cell,--.

In Column 10 at Line 42, in Claim 1, change "LIE" to --UE, and wherein the target base station performs handover cause filtering based on a notification condition--.

In Column 10 at Line 48, in Claim 2, change "LIE" to --UE--.

In Column 10 at Line 50, in Claim 3, change "LIE" to --UE--.

In Column 10 at Line 66, in Claim 4, change "re\-establishment" to --"re-establishment"--.

In Column 11 at Line 18, in Claim 4, change "a-the" to --"the"--.

In Column 11 at Line 23, in Claim 4, change "cell" to --"cell,"--.

In Column 12 at Line 1, in Claim 4, add "and wherein the target base station performs handover cause filtering based on a notification condition.".

In Column 12 at Line 5, in Claim 5, change "a-the" to --the--.

In Column 12 at Line 11, in Claim 5, change "'a-the" to --the--.

CERTIFICATE OF CORRECTION (continued)
U.S. Pat. No. 9,521,594 B2

In Column 12 at Line 15, in Claim 5, change "rhea" to --the--.

In Column 12 at Line 18, in Claim 5, change "rhea" to --the--.